US008149652B2

(12) United States Patent
Erden et al.

(10) Patent No.: US 8,149,652 B2
(45) Date of Patent: Apr. 3, 2012

(54) COMPENSATING THE EFFECTS OF STATIC HEAD-MEDIA SPACING VARIATIONS AND NONLINEAR TRANSITION SHIFT IN HEAT ASSISTED MAGNETIC RECORDING

(75) Inventors: Mehmet Fatih Erden, Pittsburgh, PA (US); Priyadarshee Deeptarag Mathur, Shakopee, MN (US); William Albert Challener, Sewickley, PA (US); Edward Charles Gage, Mars, PA (US); Wei Peng, Wilkinsburg, PA (US); Terry Wayne McDaniel, Volcano, CA (US); Tim Rausch, Gibsonia, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 370 days.

(21) Appl. No.: 12/400,865

(22) Filed: Mar. 10, 2009

(65) Prior Publication Data

US 2009/0207519 A1  Aug. 20, 2009

Related U.S. Application Data

(62) Division of application No. 11/397,146, filed on Apr. 3, 2006, now Pat. No. 7,515,372.

(51) Int. Cl.
*G11B 11/00* (2006.01)
*G11B 5/02* (2006.01)
(52) U.S. Cl. ............... 369/13.02; 369/13.15; 360/59
(58) Field of Classification Search .............. None
See application file for complete search history.

(56) References Cited

U.S. PATENT DOCUMENTS

| 4,146,911 | A | 3/1979 | Gyi et al. |
|---|---|---|---|
| 4,777,544 | A | 10/1988 | Brown et al. |
| 4,878,028 | A | 10/1989 | Wang et al. |
| 4,885,645 | A | 12/1989 | Hashimoto |
| 5,130,866 | A | 7/1992 | Klaassen et al. |
| 5,317,219 | A | 5/1994 | Lupi et al. |
| 5,335,118 | A | 8/1994 | Meyer |
| 5,909,330 | A | 6/1999 | Carlson et al. |
| 6,134,691 | A | 10/2000 | Hirasaka |
| 6,147,826 | A | 11/2000 | Hashimura |
| 6,198,583 | B1 | 3/2001 | Ohinata et al. |
| 6,208,477 | B1 | 3/2001 | Cloke et al. |
| 6,288,859 | B1 | 9/2001 | Bergmans et al. |
| 6,621,648 | B2 | 9/2003 | Elliott et al. |
| 6,643,081 | B1 | 11/2003 | Walker et al. |
| 6,754,018 | B2 | 6/2004 | Takahashi |

(Continued)

OTHER PUBLICATIONS

J.W.M. Bergmans et al., "Structure and Adjustment of a Novel Write-Precompensation Scheme", IEEE Transactions on Magnetics, vol. 35, No. 3, May 1999, pp. 2053-2059.

*Primary Examiner* — Andrew L Sniezek
(74) *Attorney, Agent, or Firm* — Robert P. Lenart, Esq.; Pietragallo Gordon Alfano Bosick & Raspanti, LLP (57) ABSTRACT

An apparatus comprises a storage medium, a recording head, a source of electromagnetic radiation, and a control circuit for modulating the source of electromagnetic radiation in response to a static deviation of a spacing between the recording head and the storage medium. A method of compensating a static deviation of a spacing between a recording head and a storage medium performed by the apparatus, and a method of precompensating for nonlinear transition shifts in a heat assisted magnetic recording system, are also provided.

10 Claims, 10 Drawing Sheets

U.S. PATENT DOCUMENTS

| | | |
|---|---|---|
| 6,765,937 B1 | 7/2004 | Miller et al. |
| 6,831,797 B2 | 12/2004 | Koller et al. |
| 6,930,844 B2 | 8/2005 | Yeh et al. |
| 7,515,372 B2 * | 4/2009 | Erden et al. ................ 360/75 |
| 2004/0130993 A1 | 7/2004 | Nadershahi |
| 2004/0162938 A1 | 8/2004 | Pereira |
| 2004/0252393 A1 | 12/2004 | Wang et al. |
| 2005/0057841 A1 | 3/2005 | Stover et al. |

* cited by examiner

COMPENSATING THE EFFECTS OF STATIC HEAD-MEDIA SPACING VARIATIONS AND NONLINEAR TRANSITION SHIFT IN HEAT ASSISTED MAGNETIC RECORDING

CROSS REFERENCE TO RELATED APPLICATION

This application is a divisional application of U.S. patent application Ser. No. 11/397,146, filed Apr. 3, 2006, and titled "Compensating the Effects of Static Head-Media Spacing Variations and Nonlinear Transition Shift in Heat Assisted Magnetic Recording", now U.S. Pat. No. 7,515,372, which is hereby incorporated by reference.

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to data storage devices and more particularly to methods and apparatus that compensate for the effects of variation in static head-media spacing in data storage devices.

BACKGROUND OF THE INVENTION

A typical disc drive includes a housing that encloses a variety of disc drive components. The components include one or more rotating discs having data surfaces that are coated with a medium for storage of digital information in a plurality of circular, concentric data tracks. The discs are mounted on a spindle motor that causes the discs to spin. Each rotating disc has a corresponding head gimbal assembly (HGA). The HGA includes a slider, which carries a transducer that writes information to and reads information from the data surfaces of the discs. The slider and transducer are often together referred to as the "head." The HGA also includes a gimbal that allows the slider to pitch and roll while following the topography of the disc. An actuator mechanism moves the HGAs from track to track across the surfaces of the discs under control of electronic circuitry. The actuator mechanism includes a track accessing arm and a suspension for each HGA. The suspension includes a load beam. The load beam provides a preload force, which forces the slider toward the disc surface.

During operation, as the discs rotate, the discs drag air under the respective sliders and along their bearing surfaces in a direction approximately parallel to the tangential velocity of the discs. As the air passes beneath the bearing surfaces, air compression along the air flow path causes the air pressure between the discs and the bearing surfaces to increase, creating a hydrodynamic lifting force that counteracts the load force provided by suspensions. The hydrodynamic lift force causes the sliders to lift and fly above or in close proximity to the disc surfaces.

In a magnetic recording system it is desired to keep the magnetic head at a known constant distance from the magnetic medium surface in order to meet overall system performance and reliability measures. For this purpose, air bearing designs should take into account the given head and media specifications to compensate any deviations from the desired height. However, the magnetic head does not always fly over the medium of interest with a desired Head-Media Spacing (HMS), but rather deviates from this desired value. There are two main components of HMS deviation from the desired value.

Static HMS deviations result from manufacturing variations in head and media combinations. In general, each head will fly at a different average height over the medium. The average fly height is also a function of the radius at which the head is flying. For a given radius, the difference between the mean fly height of any head/media pair and the desired HMS is defined as static HMS variation.

Dynamic HMS deviations cause the HMS to vary about the mean fly height due to factors such as compressibility of the air bearing, asperities on the medium, excitation of the suspension, and gimbal modes on which the head is mounted, etc. Dynamic HMS variation is defined as the variation in fly height about the mean fly height for a given head and medium combination at a given radius.

In one conventional recording system, the mean static HMS was measured at 17.05 nm, with a standard deviation of 0.34 nm. This variation is large enough to cause poor system performance and reliability in some production line samples. The HMS values for those samples can be detected, and a compensation mechanism can be applied to those samples to correct for deviations from the desired HMS. A known compensation mechanism is based on applying heat to the write head prior to writing in order to cause the pole tip of the writer to protrude from the head to achieve the desired static HMS. That technique requires heat that is produced using the preamp in the data storage system to power a heater on the head. The amount of heat to be applied as a function of the disc radius is determined during a factory calibration routine.

In conventional (longitudinal and perpendicular) magnetic recording, whenever the applied field is larger than the coercivity ($H_c$) of the medium, the medium will be magnetized towards a $+M_r$ (positive remanent magnetization) direction (i.e., magnetized left or up), and similarly if the applied field is smaller than $-H_c$ the magnetization will be towards a $-M_r$ direction (i.e., magnetized right or down).

However, the conventional magnetic recording architectures are limited by well-known super paramagnetic limits. Heat Assisted Magnetic Recording (HAMR) uses a medium with very high coercivity $H_c$ to make sure that the medium is thermally stable with very small grain volumes V. The coercivity is reduced during the write process by heating the medium, for example with a focused laser beam. Once the medium is heated, the reduced coercivity makes writing possible. Then, after writing the bit, the medium cools back to its original temperature with high coercivity H, allowing the medium to be thermally stable.

There is a need for a HMS compensation method that can be applied to heat assisted magnetic recording.

SUMMARY OF THE INVENTION

This invention provides an apparatus comprising a storage medium, a transducer, a source of electromagnetic radiation, and a control circuit for modulating the source of electromagnetic radiation in response to a static deviation of a spacing between the transducer and the storage medium.

In another aspect, the invention provides a method of compensating a static deviation of a spacing between a transducer and a storage medium. The method comprises: producing a control signal representative of the static deviation in spacing between the transducer and the storage medium, and modulating a source of electromagnetic radiation to heat a portion of the storage medium in response to the control signal.

The invention further encompasses a method of compensating a nonlinear transition shift in a heat assisted magnetic storage system. The method comprises: producing a control signal representative of nonlinear transition shift, modulating a source of electromagnetic radiation to heat a portion of the storage medium in response to the control signal, and applying a magnetic field to the storage medium to cause magnetic transitions in the storage medium, wherein transition locations in the storage medium are changed by changing a temperature profile in the storage medium.

The invention also encompasses a method of compensating for disturbances in a storage device. The method comprises: comparing a read signal with an optimum read signal parameter to produce a control signal, and modulating a source of electromagnetic radiation to heat a portion of a storage medium in response to the control signal.

DETAILED DESCRIPTION OF THE INVENTION

Figure 1:
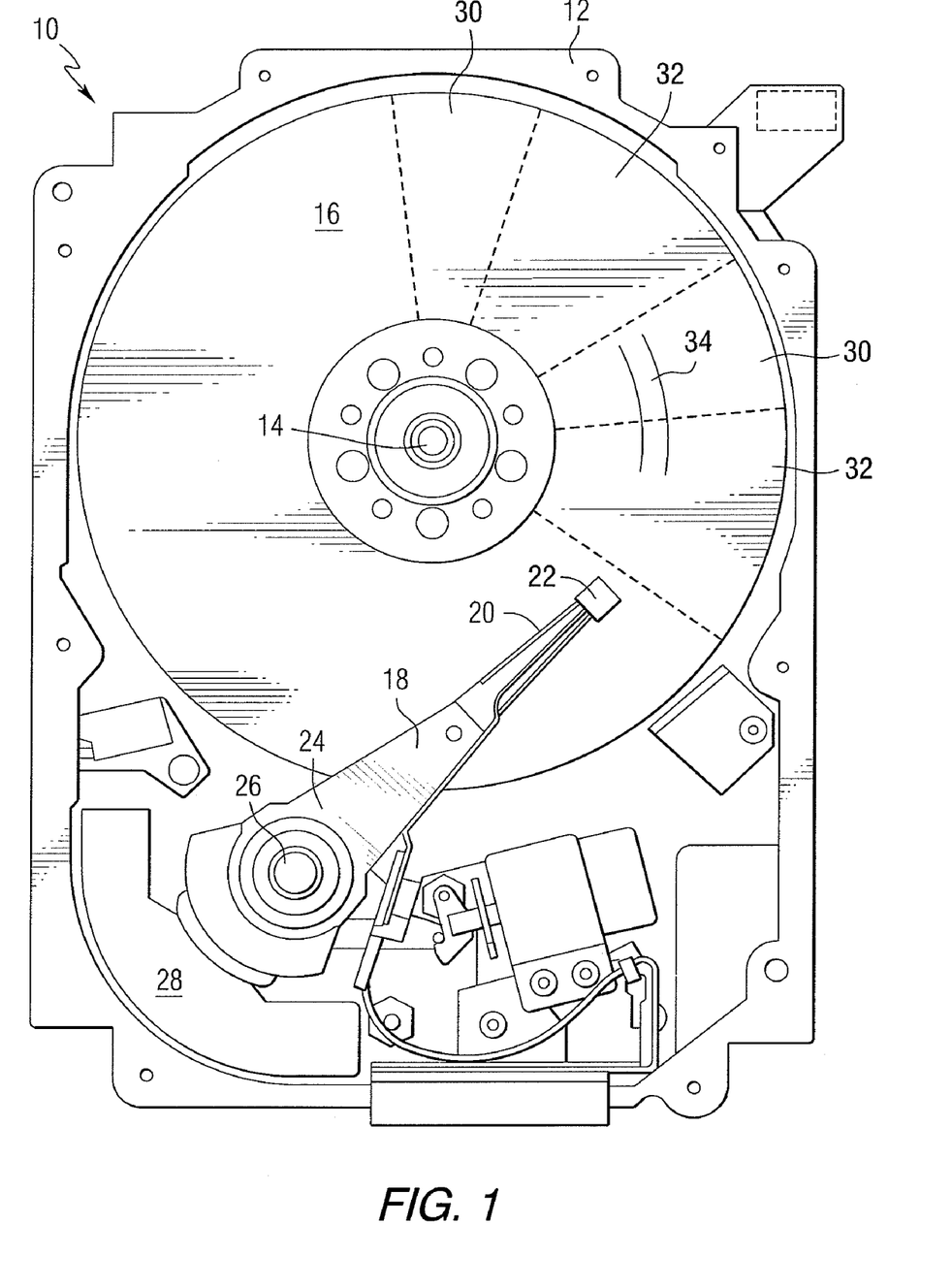
FIG. 1 is a pictorial representation of the mechanical portion of a disc drive that can be constructed in accordance with an embodiment of the invention.

Referring to the drawings, FIG. 1 is a pictorial representation of the mechanical portion of a disc drive 10 that can be constructed in accordance with the invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a transducer in the form of a recording and/or reading head or slider 22, and a second end 24 pivotally mounted on a shaft by a bearing 26. An actuator motor, which may be a voice coil motor 28, is located at the arm's second end 24, for pivoting the arm 18 to position the head 22 to a desired position. The actuator motor 28 is controlled by a controller that is not shown in this view. The disc includes a plurality of servo sectors 30 arranged between a plurality of data sectors 32. The data and servo information is contained in a plurality of tracks 34.

Figure 2:
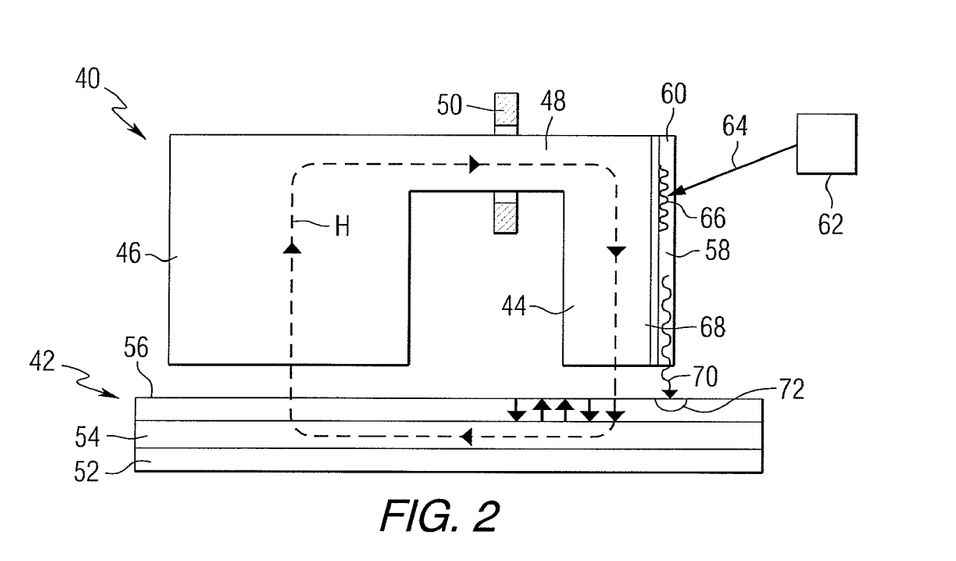
FIG. 2 is a schematic representation of a recording head that can be used in apparatus constructed in accordance with an embodiment of the invention.

FIG. 2 is a schematic representation of a heat assisted magnetic recording head 40 that includes an optical transducer, in combination with a magnetic recording medium 42, that can be used in an apparatus constructed in accordance with this invention. Although FIG. 2 shows a perpendicular magnetic recording head and a perpendicular magnetic recording medium, it will be appreciated that the invention may also be used in conjunction with other types of recording heads and/or recording mediums where it may be desirable to employ heat assisted recording. The recording head 40 in this example includes a writer section comprising a main write pole 44 and a return or opposing pole 46 that are magnetically coupled by a yoke or pedestal 48. A magnetization coil 50 surrounds the yoke or pedestal 48 for energizing the recording head 40. The recording head 40 may also include a read head, not shown, which may be any conventional type of read head as is generally known in the art.

Still referring to FIG. 2, the recording medium 42 is positioned adjacent to or under the recording head 40. The recording medium 42 includes a substrate 52, which may be made of any suitable material such as ceramic glass or amorphous glass. A soft magnetic underlayer 54 is deposited on the substrate 52. The soft magnetic underlayer 54 may be made of any suitable material such as, for example, alloys or multilayers having Co, Fe, Ni, Pd, Pt or Ru. A hard magnetic recording layer 56 is deposited on the soft underlayer 54, with the perpendicular oriented magnetic domains contained in the hard layer 56. Suitable hard magnetic materials for the hard magnetic recording layer 56 may include at least one material selected from, for example, FePt or CoCrPt alloys having a relatively high anisotropy at ambient temperature.

The recording head 40 also includes a planar waveguide 58 that directs light received from a light source onto a surface of a recording medium to heat the magnetic recording medium 42 proximate to where the write pole 44 applies the magnetic write field H to the recording medium 42. The planar waveguide includes a light transmitting layer 60. The optical waveguide 58 acts in association with a light source 62 which transmits light, for example via an optical fiber 64, that is coupled to the optical waveguide 58, by a coupling means such as a grating 66. The light source 62 may be, for example, a laser diode, or other suitable source of electromagnetic (EM) radiation. This provides for the generation of a guided mode that propagates through the optical waveguide 58 toward the recording medium. EM radiation, generally designated by reference number 70, is transmitted from the waveguide 58 for heating the recording medium 42, and particularly for heating a localized area 72 of the recording layer 56.

Figure 3:
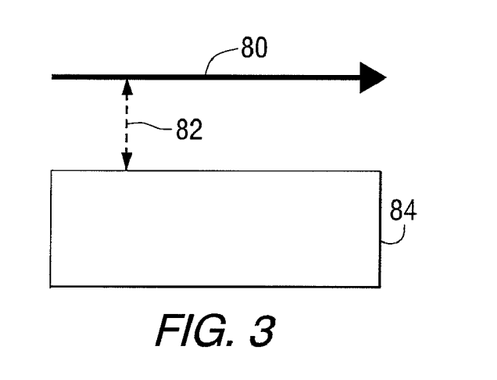
FIGS. 3, 4 and 5 are schematic diagrams that show various Head-Media Spacing (HMS) parameters.
Figure 4:
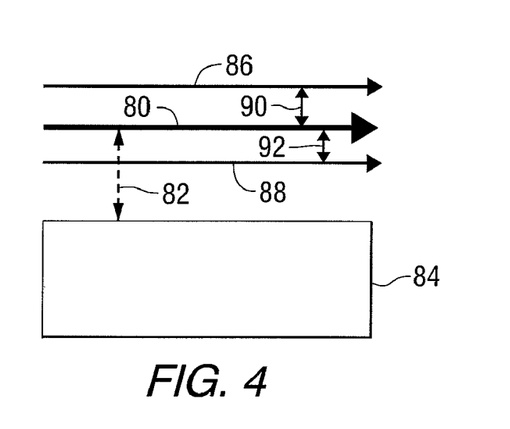
Figure 5:
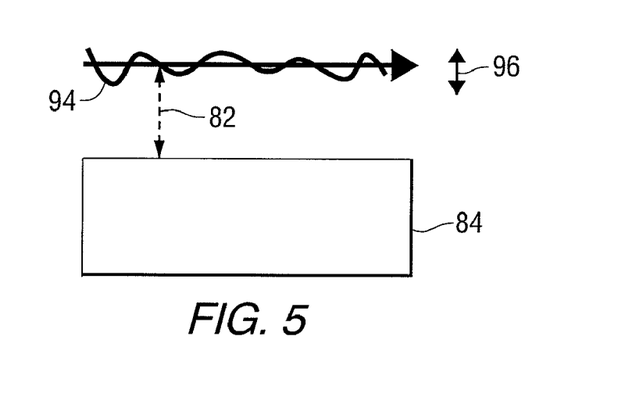

FIGS. 3, 4 and 5 are schematic diagrams that show various Head-Media Spacing (HMS) parameters. In FIG. 3, an arrow represents an air bearing surface 80 of a recording head that is spaced at a desired head-media spacing 82 above a storage medium 84. FIG. 4 shows alternative average air bearing surface positions as arrows 86 and 88. In the average position indicated by arrow 86, the static variation in HMS is shown as arrow 90. In the average position indicated by arrow 88, the static variation in HMS is shown as arrow 92. FIG. 5 shows a dynamic change in HMS as line 94. The range of the dynamic variation in HMS is shown as arrow 96.

In Heat Assisted Magnetic Recording, heat is applied through a light delivery system directly to the medium of interest during the writing process, and the applied heat changes the coercivity profile of the medium that is directly under the head, thus changing the overall system behavior.

Figure 6:
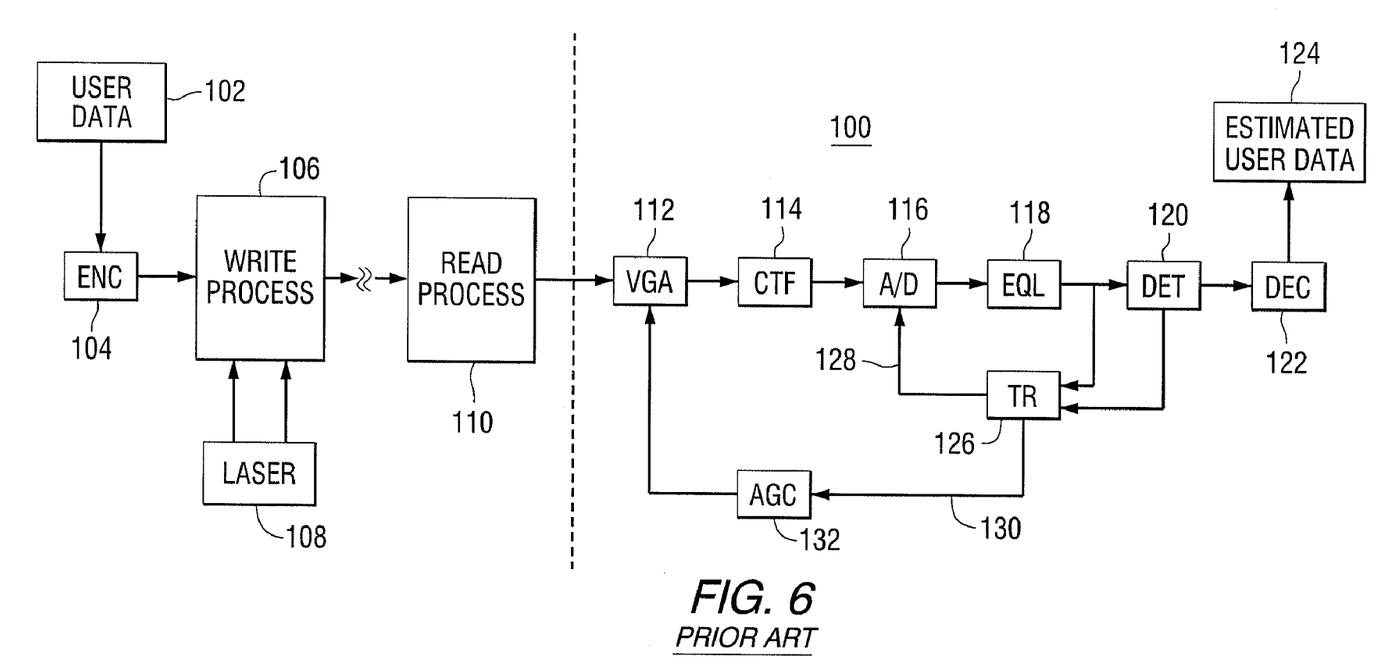
FIG. 6 is a functional block diagram of a prior art HAMR system.

A generic prior art HAMR system 100 is shown in FIG. 6. User data 102 is input to an encoder 104 and subjected to a HAMR write process 106. During writing, a laser 108 is used to heat the recording medium to temporarily reduce the coercivity of the medium. When the data is to be read, a read head produces a read signal in a read process 110. The read signal is passed to a variable gain amplifier 112, filtered in a filter 114 and converted to a digital signal in an analog-to-digital converter 116. The digital signal is equalized in an equalizer 118 and passed to a detector 120 for a subsequent decision 122 to produce an estimate of the user data 124. A timing recovery circuit 126 receives signals from the equalizer output and the detector to produce a signal on line 128 that controls the analog-to-digital converter. The timing recovery circuit also produces a signal on line 130 that is used by an adaptive gain controller 132 to control the variable gain amplifier 112.

In the system of FIG. 6, heat is present in the system while writing encoded user data to the medium (in the write process). During the read process, analog readback signals are produced by read head and sent to a read channel.

Figure 7:
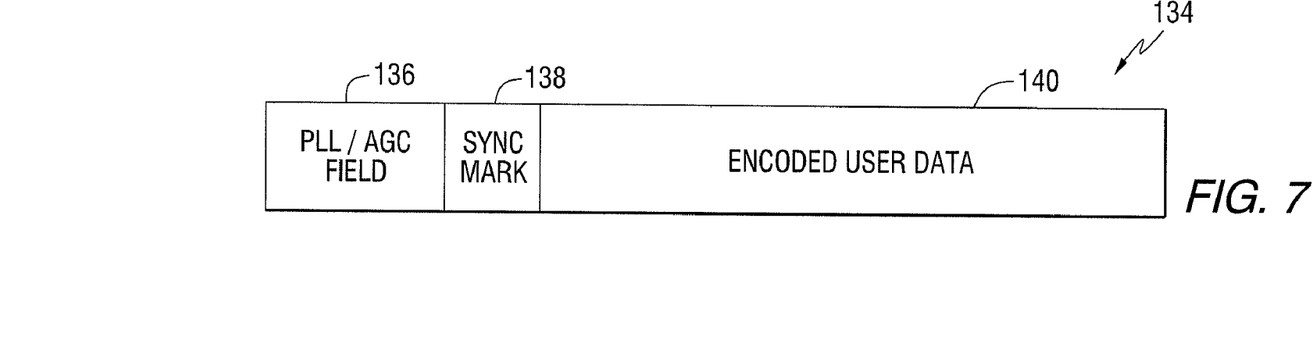
FIG. 7 is a schematic representation of a sector format.

The encoded user data is processed as sector-by-sector data. A generic sector format 134 is shown in FIG. 7. During the read process, the readback signal corresponding to the "PLL/AGC Field" 136 at the beginning of each sector is used to adjust both the gain of the variable gain amplifier (VGA) through the adaptive gain controller (AGC) and also the sampling instants for the analog-to-digital converter (A/D) through the timing recovery (TR) block in FIG. 6. The outputs of the AGC and timing recovery blocks estimate the average signal amplitude and the phase of the noisy readback signal obtained after the read process. Then, the readback signal corresponding to the "Sync Mark" field 138 is processed to make sure that the system can detect the known pattern written at that field. Once the sync mark is detected, the read channel architecture is assumed to be ready to process the encoded user data 140.

This invention detects the amount of static HMS in the system by measuring the magnitude of the signal read by the read channel. Then, the laser power is changed to alter the physical channel operating point in order to compensate any static HMS variations from the ideal value.

The coercivity profile of the medium in HAMR systems depends on the temperature profile applied to the storage medium during writing. Thus, the coercivity at any point of the medium will be a function of the temperature value at that point, i.e., a higher temperature results in a lower coercivity.

A transition in the direction of magnetization of the media occurs whenever the applied field strength is equal to the coercivity of the medium. However, the temperature profile also defines the location of the transition. In other words, the transition location in the storage medium on a HAMR system can be changed by changing the temperature profile created by light supplied from the laser source.

Figure 8:
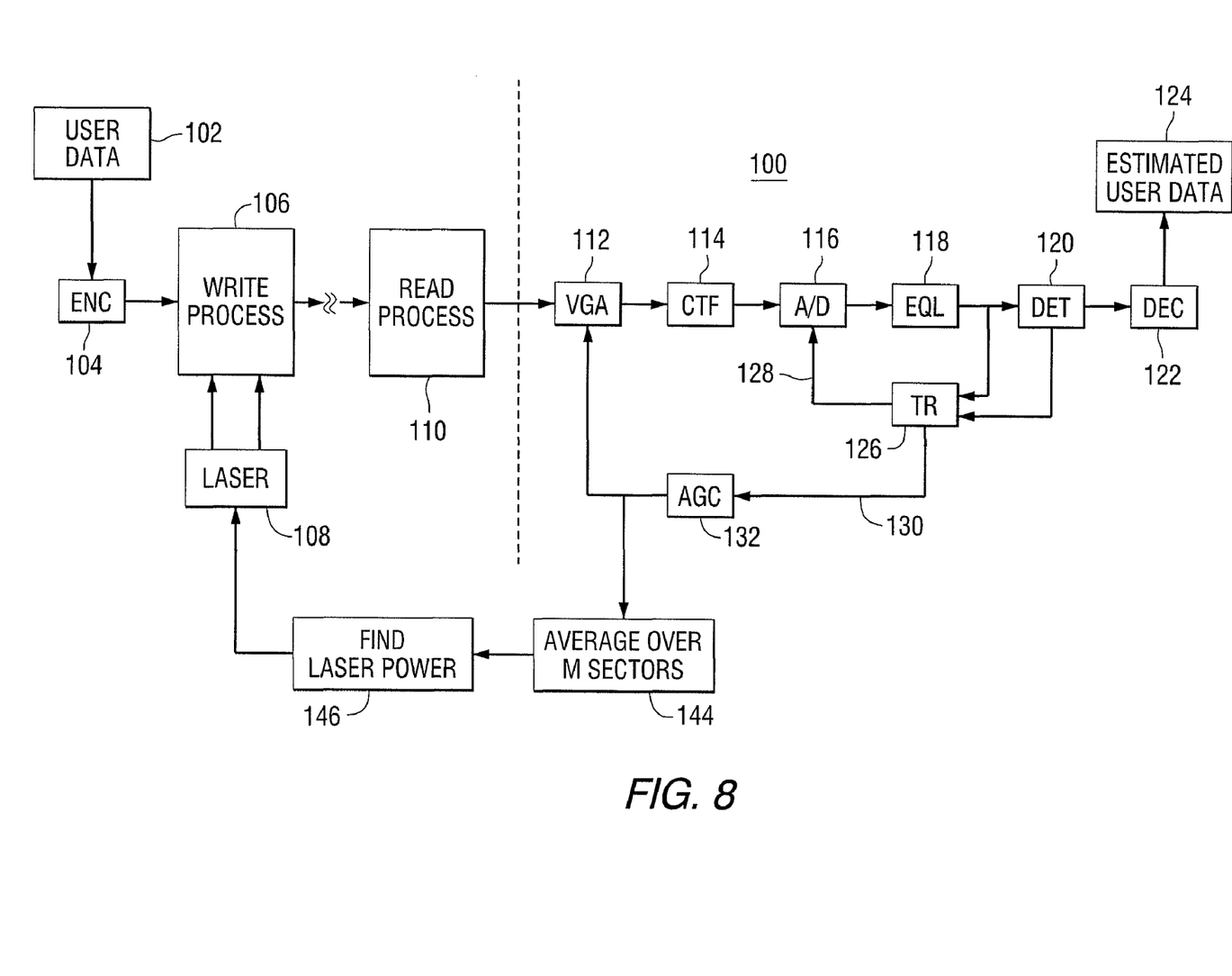
FIG. 8 is a functional block diagram of a HAMR system constructed in accordance with an embodiment of the invention.

A system constructed in accordance with the invention is shown in FIG. 8. The system of FIG. 8 includes two additional blocks that are not found in the generic system of FIG. 6. A first one 144 of the additional blocks computes the average magnitude of the read signal over M sectors. This block uses the output of the adaptive gain controller (AGC) as its input. Since the fly height of the reader is correlated to the strength of the readback signal, the output of the AGC can be used to infer static HMS for a given radius. In practice, the AGC output can be noisy and vary considerably from sector to sector due to non-uniformities in the medium and dynamic HMS variations. The output of block 144 is a signal representative of the average HMS (the static HMS parameter). This signal is then used to modulate the power of the laser. Once the amount of static HMS has been estimated, the "Find Laser Power" block 146 finds the amount of laser power for a given radius, which compensates the static HMS effects. In the "Find Laser Power" block, mapping from the static HMS parameter to the laser power amount can be implemented using a look-up table.

Figure 9:
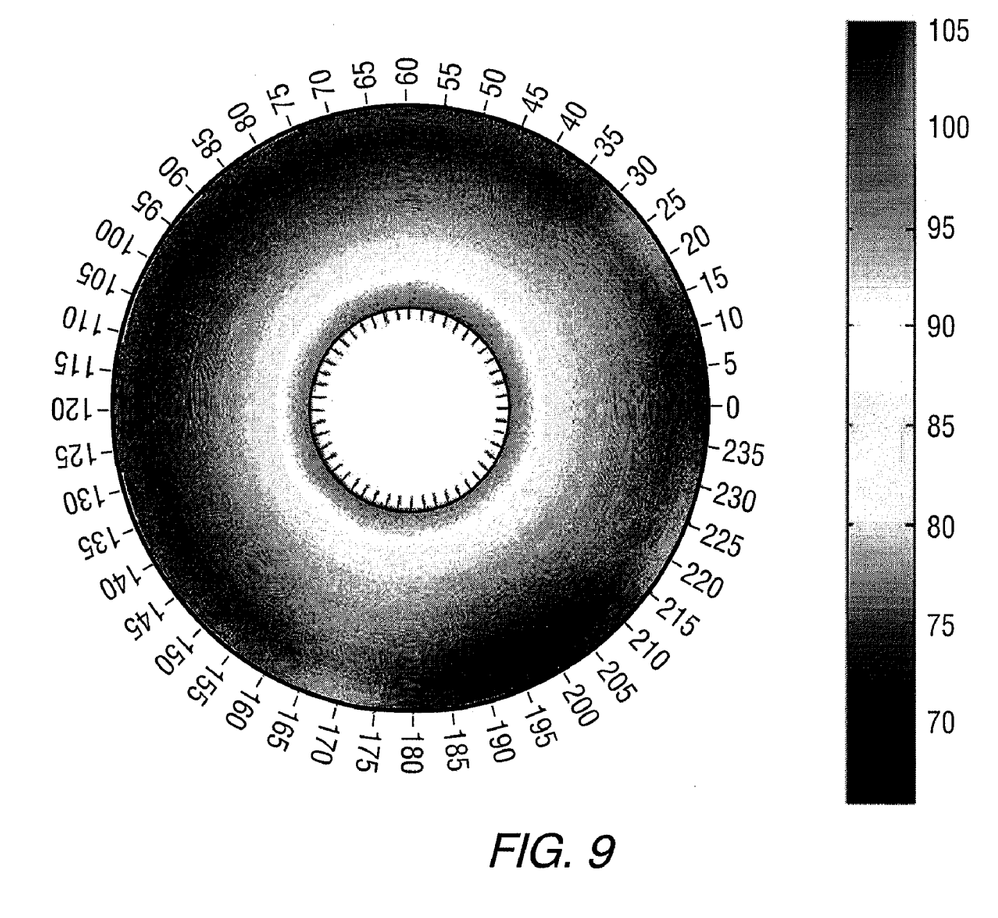
FIG. 9 is a schematic representation of radial variation in an AGC signal.

FIG. 9 shows an example AGC variation pattern as a function of the head location on the disc surface. As can be seen from FIG. 9, for a given radius, the AGC value may fluctuate. Thus, averaging the AGC output over M sectors will reduce these effects, and will also eliminate dynamic HMS variations. The number M is a function of the amount of random fluctuations in the system, and the averaging should not be done if a fatal distortion (such as thermal asperity) or nonlinearity is detected. FIG. 9 also shows how the AGC values may change as a function of radius, thus averaging should also be done at different radial locations.

Figure 10:
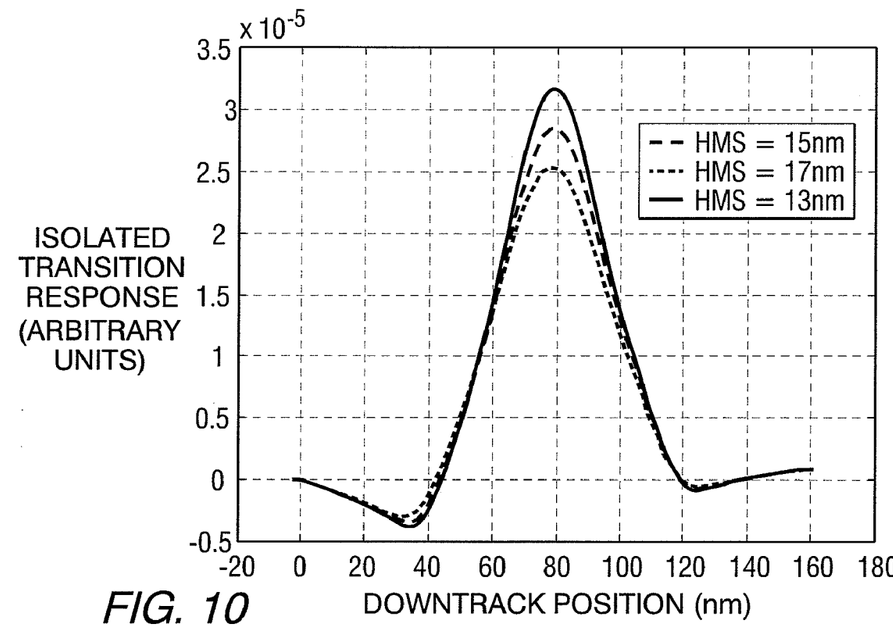
FIG. 10 is a graph illustrating isolated transition responses for different HMS values for a fixed temperature.
Figure 11:
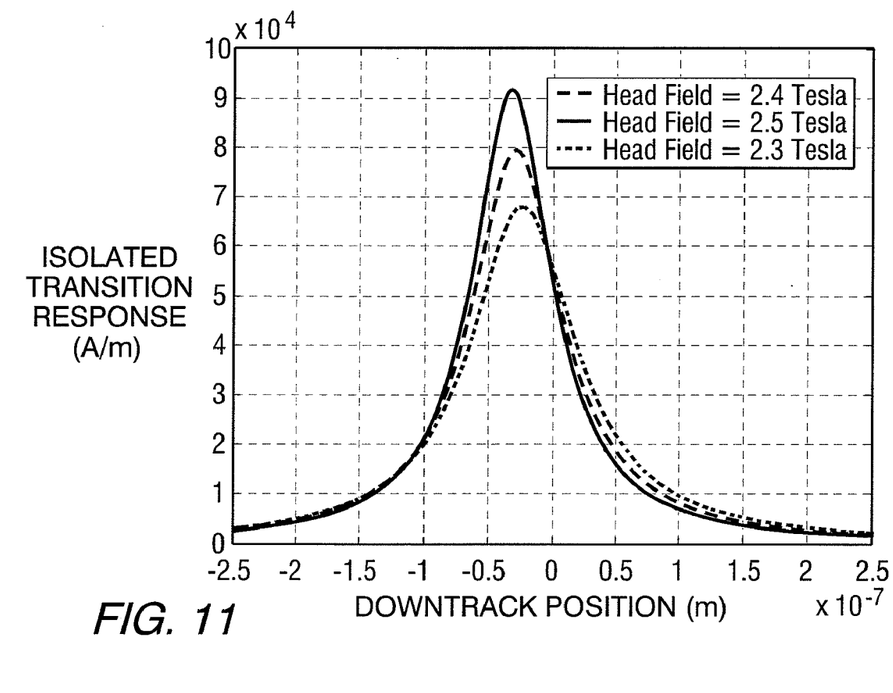
FIG. 11 is a graph illustrating isolated transition responses for different head fields for a fixed temperature.

In order to illustrate the effectiveness of the invention, a simulator has been used to obtain signal magnitudes corresponding to a dibit at different HMS values at a fixed temperature. The simulation results shown in FIG. 10 suggest that 2 nm of difference from a desired value of 15 nm may result in a very big difference in the system dibit response energy, which directly translates into the signal energy and Signal-to-Noise Ratio (SNR) of the system. This means that the rest of the read channel architecture already designed for a desired HMS value (for example, 15 nm in this example) can either suffer from degraded performance (because of lower SNR when the HMS increases) and/or from robustness (because of the change in channel response). A similar behavior is found with the Thermal Williams-Comstock model as illustrated in FIG. 11, which shows the isolated transition responses for different head fields at a fixed temperature. The amounts of the head fields in FIG. 11 are arranged to show a similar trend as shown in FIG. 10.

Figure 12:
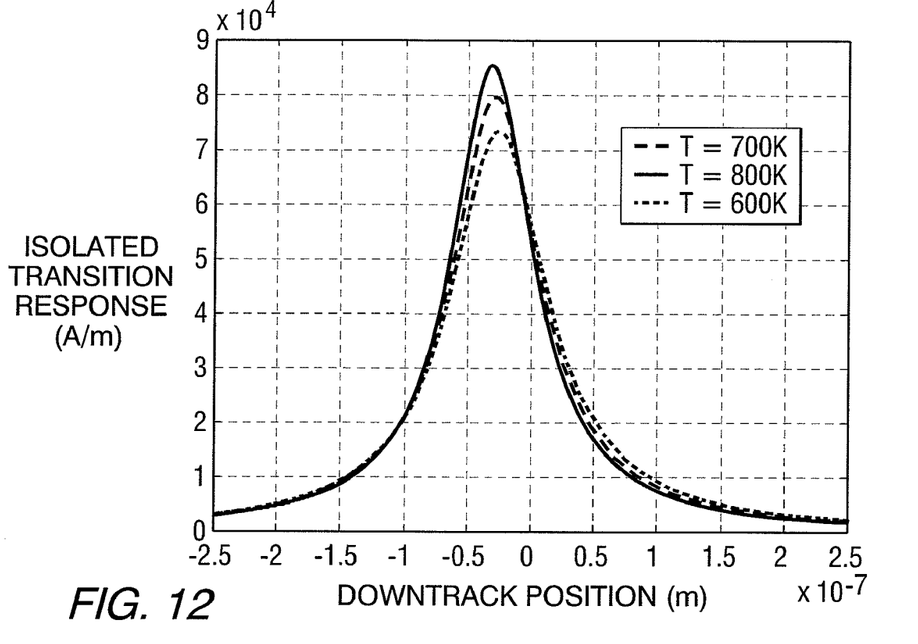
FIG. 12 is a graph illustrating isolated transition responses for different temperatures with a fixed head field.

In a HAMR system, the amount of heat transferred to the media also changes the channel response. This is illustrated in FIG. 12. Thus, changes of the channel response in FIG. 12 can be compensated by adjusting the temperature profile in the system. This is illustrated in FIG. 13.

Figure 13:
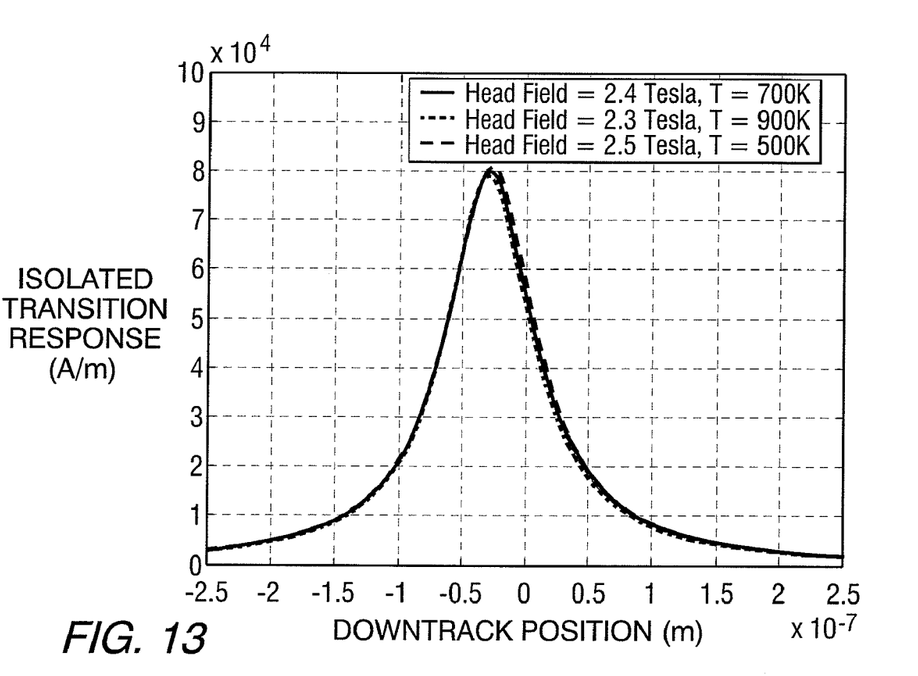
FIG. 13 is a graph illustrating isolated transition responses for different head fields and temperatures.

The simulation did not consider the track width increase, thermal profile Full-Width-Half-Maximum (FWHM) increase, or thermal gradient decrease as a function of HMS while obtaining the simulation results shown in FIG. 13. With these effects present, the static HMS changes in the system may not be fully recoverable. Nevertheless, some or major part of the static HMS variations will be recoverable. The system can be tuned once, for example during the power-up of the hard drive at the very beginning of its operation, to set the laser power at each radius. Then, the same laser power can be kept for a given radius if the static HMS does not change over time for a given hard disk architecture.

Several embodiments of the invention can be practically implemented, depending on the nature and magnitude of the HMS variation contributors such as operating temperature, pressure, mechanical expansion of materials, change in laser power over time or due to alignment shifts, and pole tip wear on the head. For example, if the operating radius and temperature are the most significant contributors to HMS variation, a manufacturing process can calibrate and save the required laser power tables to non-volatile drive memory (or even somewhere in a reserved area on the drive that can be read upon power-up). If some of the aforementioned variation contributors can change while a drive is in service, then periodic self-calibration operations may be executed by the drive to keep the HMS constant. Such methods are routinely employed in conventional drives to keep critical drive parameters in calibration over each drive's service life.

Figure 14:
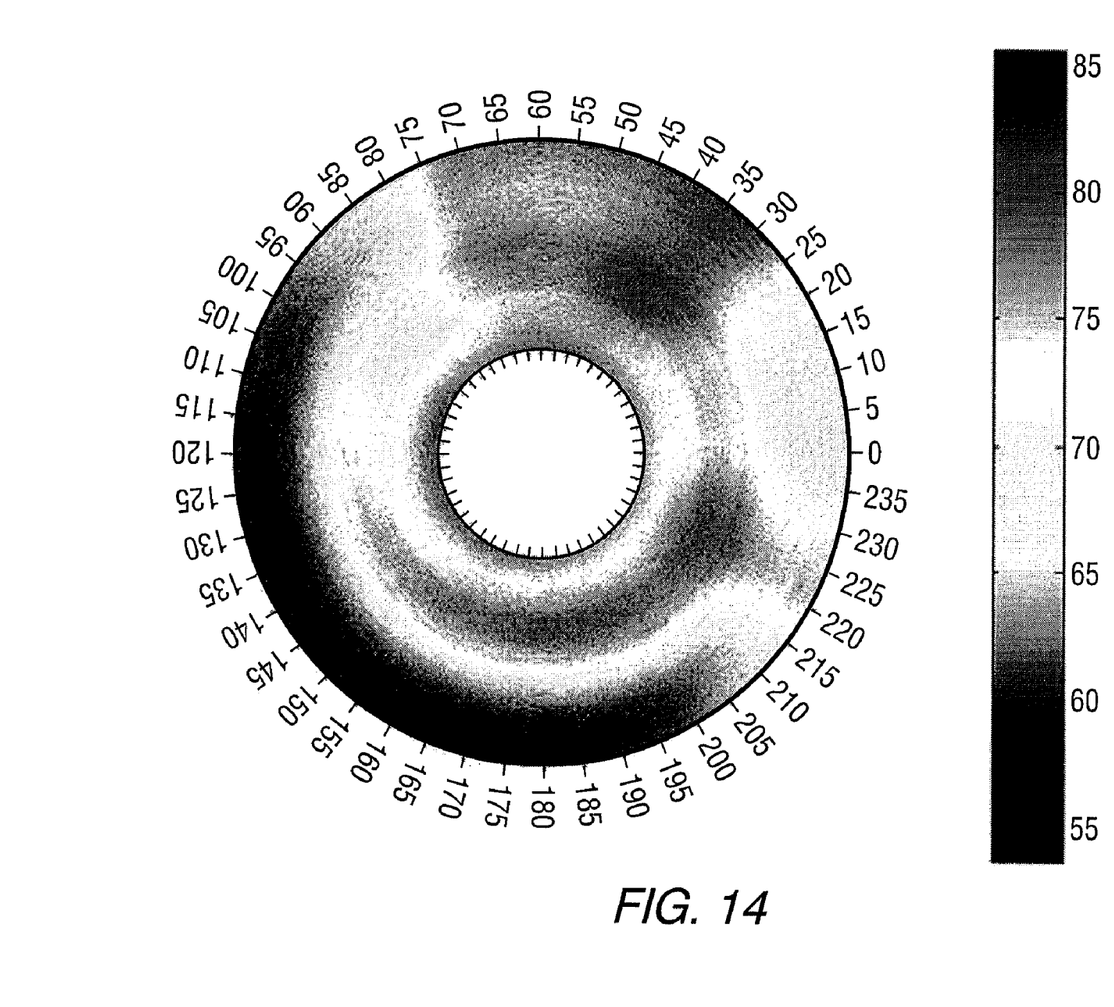
FIG. 14 is a schematic representation of AGC variation for a non-uniformly coated media.

In addition, changes in the HMS may also occur due to coating variations. FIG. 14 shows an example of a non-uniformly coated media. The AGC is once again an indicator of the readback amplitude, which is modulated by the media coating variation. This information can be compressed in both radial and circumferential dimensions and stored in a look-up table. Then the information can be applied using the method described above to compensate for systematic radial and circumferential changes in coating uniformity.

This invention addresses the effects of variations in static HMS by properly choosing the laser power in a HAMR system. A system that implements the method is simple to implement and effective in eliminating the effects of static HMS variations. The system can be tuned at first at different radial locations to account for any slowly changing HMS variations (for example due to non-uniformities in media coatings). Then, it can be periodically tuned for time varying parameters, such as temperature changes, laser aging, coupling efficiency changes, changes in media uniformity, and such, to increase the overall system performance.

Modulating the temperature profile not only changes the location of the magnetic transitions in the storage medium, but also alters the transition width of the system. This may cause signal energy loss, an increase in Inter-Symbol-Interference (ISI), or miss-equalization at off-track values. Thus, it is important to choose an operating temperature range that will produce the desired results without introducing any other unwanted effects.

One way to chose an appropriate operating temperature range is to find the nominal peak laser power (i.e., the nominal peak temperature in the system) which gives less reduction in signal energy, reasonable ISI, and small miss-equalization effects at practical off-track range of interest, and does not degrade the head disk interface. Then, find the range of the peak laser power around its nominal value (i.e., the range of the peak temperature in the system which is used to adjust the transition shifts) so that the change in signal energy, ISI, and miss-equalization at off-track positions within that temperature range are minimum.

During the write process of magnetic recording, location of the written bits can be shifted due to demagnetization fields of the adjacent bits. This data dependent nonlinear shift is called Nonlinear Transition Shift (NLTS), and creates unwanted distortion in the system. NLTS degrades the magnetic recording system performance, and write precompensation blocks are available in conventional read channel chips to cancel this effect.

As the Heat Assisted Magnetic Recording (HAMR) system is essentially a magnetic recording system, this unwanted transition shift effect may also be present in HAMR systems. Moreover, since the envisioned areal density for HAMR is much higher than the areal densities of today's commercial products, the effect of NLTS may be even worse.

A first look-up table of information representative of the relationship between the data pattern and the amount of shift caused in the system can be established. Similarly, a second look-up table of information representative of the relationship between the amount of shift to be compensated and the laser power profile corresponding to that particular shift can also be established.

The process can then proceed as follows. At time instant k, get the bits $a_{k-L}$, $ak_{-L+1}$ ... $a_k$ ... $a_{k+L-1}$, $a_{k-L}$, where it is assumed that only the bits within a span of $\pm L$ samples affect the transition at time k.

Using the first look-up table, identify the amount of shift caused by bits $a_{k-L}$, $a_{k-L+1}$ ... $a_k$ ... $a_{k+L-1}$, $a_{k+L}$ on the transition of interest at time k.

Using the second look-up table, map the amount of shift in the laser power profile that compensates the particular transition of interest, and also compensates for any excessive ISI in the system (if there is any). Then write the transition at time k, with the specified laser power profile.

The method can be simplified by combining the two look-up tables into one look-up table. However, the method has been described using two look-up tables for the sake of clarity in explanation.

Successful performance of the laser modulation method described above depends on how well the laser can be modulated. There are a number of different techniques for actively changing the laser power during the recording process. Some are better suited to an integrated HAMR drive, while others are better suited to a spin stand environment. For the sake of completeness, multiple modulation methods are described below.

Figure 15:
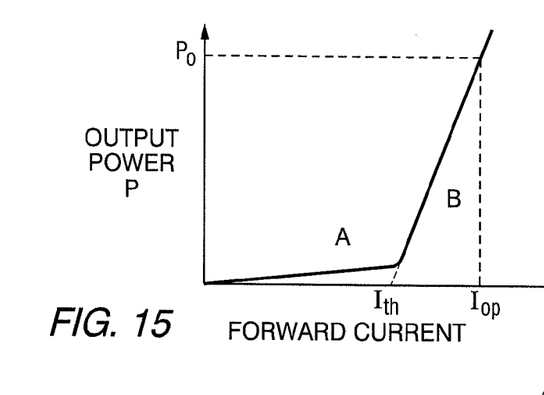
FIG. 15 is a graph of laser power versus drive current.

Modulating the laser by modulating the drive current directly is most likely the best solution for an integrated HAMR drive. The amount of laser power emitted from a laser diode is proportional to the drive current as shown in FIG. 15. Increasing or decreasing the drive current can easily control the output power. Many laser driver chips exist today that are specifically designed to modulate laser diodes and boast rise and fall times under 1 ns. The chips also allow for different laser pulsing schemes, which are data dependent. For example, in many CD and DVD recording schemes the laser driver pulses the laser in order to control the mark shape and prevent bloom.

FIG. 15 is a graph of laser power versus drive current. In FIG. 15, region A is the LED emitting region, and region B is the laser oscillating region. For this scheme to be implemented in a HAMR drive, an integrated circuit (IC) chip could be designed with a built-in look-up table so the correct laser modulation scheme could be matched up with the data pattern that is to be recorded.

In an acoustic optical modulation system, an acoustic wave is used to scatter the laser beam into higher order diffraction modes. By changing the amplitude of the acoustic pulse, more or less light can be scattered into a particular mode. Optical power is modulated by changing the power scattered into a particular mode. Acoustic modulators are limited primarily by the amount of power they can handle (less than 100 $W/mm^2$) and the rise and fall times of the modulation (~10 ns). To integrate an acoustic optical modulator into a HAMR drive, a fused silica crystal could be placed in the path of the laser. In addition, special drive electronics would be required in order to control the crystal.

Electro-optic and magneto-optic modulation methods are very similar. Although there are many different schemes to realize modulation using these techniques, they operate on similar principles. In both cases, an application of a magnetic field or electric field to a specific crystal induces a change in the refractive index of the material, which causes the polarization of the light to be changed. By using an analyzer in conjunction with the crystal, the amount of light that passes through the modulator can be controlled. Both types of modulators are generally faster than acoustic optical modulators and can handle slightly more power. However, both are still slower than direct current modulation of the laser diode itself.

Another means for controlling the amplitude of the laser light is a liquid crystal.

Laser modulation can also be achieved by deflecting the optical beam. The coupling efficiency of light into the waveguide using the coupling grating is strongly dependent on the position of the incident spot on the grating. By adjusting the beam position, the coupling efficiency can be either decreased or increased. One method for steering the beam would be to actively tilt the laser diode or by bouncing the beam off of a mirror and changing the angle of a mirror. It is also possible to deflect a beam using the electro-optic, magneto-optic and acoustic optical effects.

Compensation has been simulated assuming ideal laser power modulation. Two independent HAMR signal modeling methods were used. The first one implements the Thermal Williams-Comstock Model together with microtrack modeling, and the second one involves a micromagnetic modeling technique.

A Thermal Williams-Comstock Model was used together with microtrack modeling to analyze the effect of temperature profile onto system behavior. During simulations, the temperature profile was assumed to be Gaussian distributed, and the same temperature profile was applied both along down-track and cross-track directions.

The coercivity $H_c$ and remanence magnetization $M_r$ was assumed to be linearly dependent on the temperature. The head field was determined using the following equation:

$$H_x = \frac{H_0}{\pi}\left[\tan^{-1}\left(\frac{x+\frac{g}{2}}{y}\right) - \tan^{-1}\left(\frac{x-\frac{g}{2}}{y}\right)\right]$$

where g represents the width of the gap, and y stands for the distance from the medium to the head. During the simulations, g was assumed to be 100 nm, and y to be 20 nm. During read operation, g was changed to be 5 nm in order to be within the assumptions of the Thermal Williams-Comstock Model. Although it might not be realizable to have read head designs which have effective 5 μm gap width, the results show a trend observed in a typical HAMR system.

Figure 16:
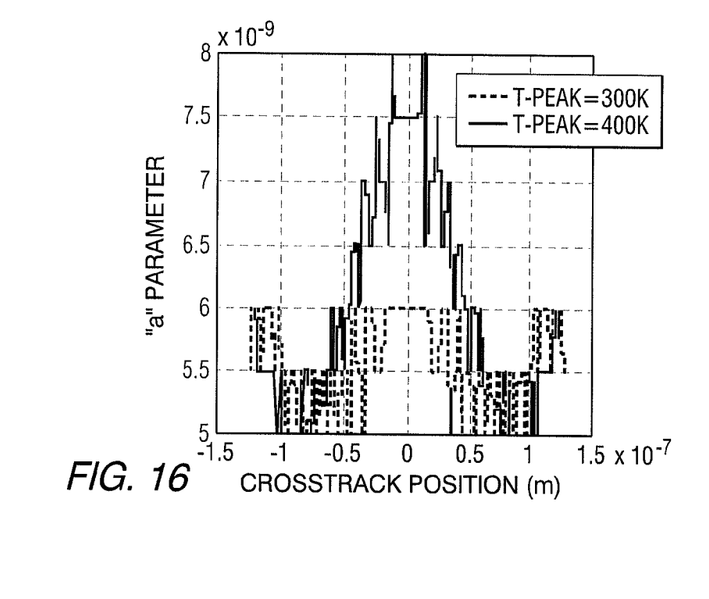
FIGS. 16 and 17 show an a-parameter profile along the cross-track direction together with a system transition response for two peak temperatures.
Figure 17:
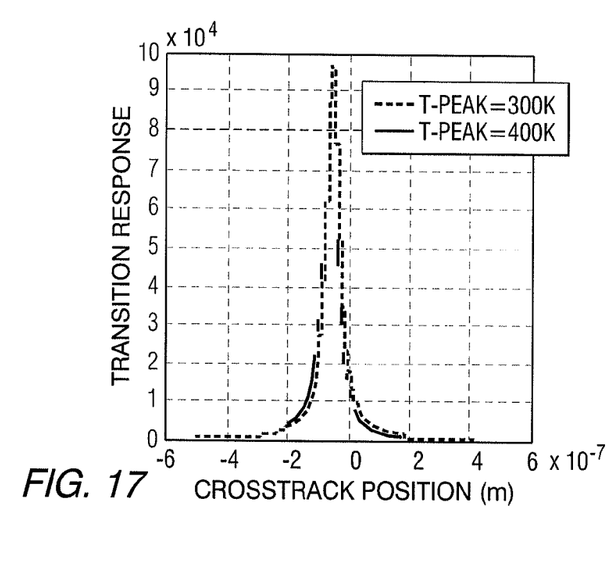

First assume the coercivity and remanent magnetization dependencies on the temperature as $H_c = -2000\ T + 1.6 \times 10^6$ $M_r = -1500\ T + 1.2 \times 10^6.$ FIGS. 16 and 17 are graphs of the changes in the a-parameter and transition response with temperature ($H_0$ of the head field is 2.4 Tesla), where the a-parameter provides an indication of transition width. FIGS. 16 and 17 show the a-parameter profile along the cross-track direction together with the system transition response for two peak temperatures. FIGS. 16 and 17 assumed the head field with $H_0$ equal to 2.4 Tesla, the peak temperature was taken as 700° K (Kelvin) and 600° K (Kelvin), Bit-Aspect-Ratio (BAR) was assumed to be 5, and Normalized Density (ND) was set to 2. The a-parameter profile and system transition response does not change significantly with temperature changes. This means that the change in signal energy, ISI, and channel miss-equalization at off-track values do not change much as the temperature changes from 600° K to 700° K. Thus for this specific case, a temperature range can be found that satisfies the first item in the algorithm.

Figure 18:
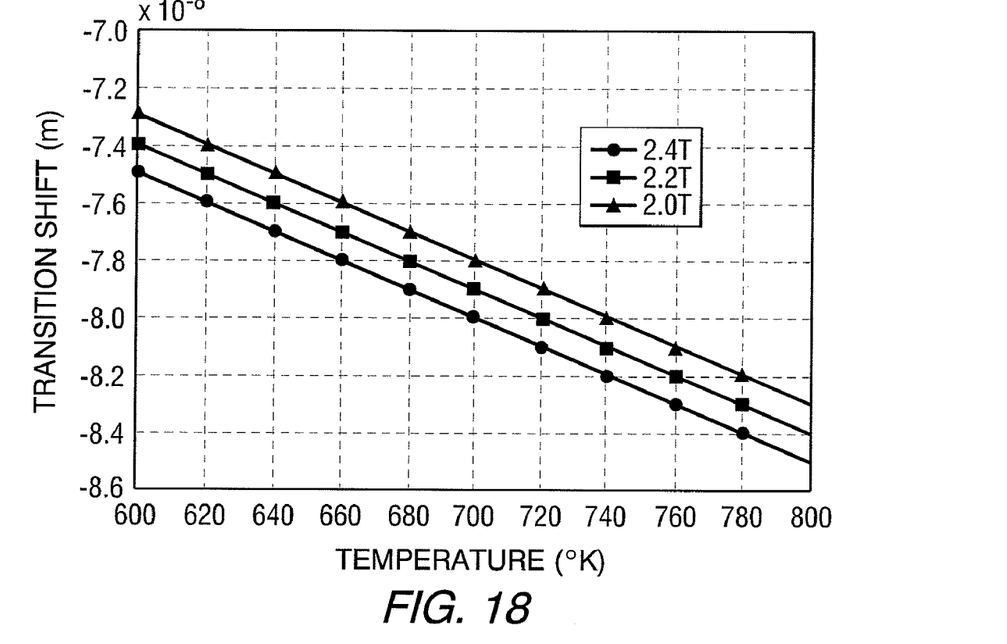
FIG. 18 is an example of a graph of transition shift as a function of temperature for different deep-gap field values in a write head.

Next, the change in transition location at the center of the track as a function of temperature was examined. Simulations have been performed assuming that the peak temperature is not modulated within the duration of bit length. FIG. 18 is a graph of transition shift as a function of temperature for different deep-gap field values in the write head. From FIGS. 16 and 17 a temperature range between 600° K and 700° K has been identified where there is not much change in signal energy, ISI, and miss-equalization at off-tracks. Assuming that the temperature value is centered at 650° K, the location of the transitions can be changed by 5 nm (for the three deep-gap field values considered) within a ±50° K temperature range. Thus, for a bit width equal to 11 nm (which corresponds to a 1 Tbpsi design for a BAR equal to 5), this corresponds to precompensating the transition shifts around 45% by only modulating the peak temperature within ±50° K range. Of course, more compensation can be provided with a larger range of temperatures.

Figure 19:
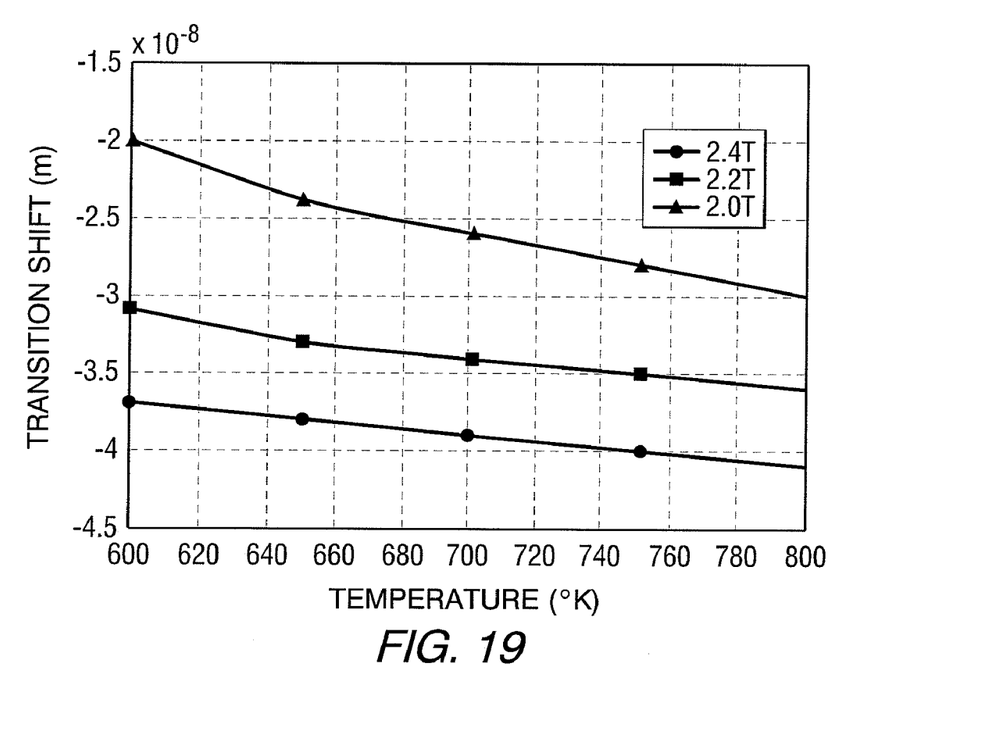
FIG. 19 is another example of a graph of transition shift as a function of temperature.

If the coercivity and remanent magnetization dependencies on the temperature are assumed to be:

$H_c = -500\ T + 80 \times 20 \times 10^3$ $M_r = -300\ T + 80 \times 15 \times 10^3,$ where the coercivity and remanent magnetization are less sensitive to temperature changes, the plots in FIG. 19 are obtained. Again, FIG. 19 is a graph of transition shift as a function of temperature, assuming a center temperature value of 650° K. In this case, the location of the transitions change by 2 nm (for a deep-gap field equal to 2.4 Tesla) to 6 nm (for a deep-gap field equal to 2 Tesla), within a ±50° K temperature range, which correspond to around 18% to 55% for bit width equal to 11 nm.

The precompensation block specifications in conventional read channel architectures indicate that it can compensate up to 10/64 (approximately 16%) of bit width for early transition shifts, and 26/64 (approximately 41%) of bit width for late transition shifts. Thus, FIGS. 15-17 show that, for example, for systems with 11 nm bit width, all of the transition shifts coming from adjacent bits can be compensated by modulating the peak temperature within a ±50° K temperature range in HAMR systems.

The temperature profile can be further modulated within the duration of the bit length by modulating the laser power faster than the bit frequency of the system. In this way, the system response shape and possible unwanted excessive ISI in the system can be controlled by deliberately induced controlled temperature changes.

Laser modulation can be used to compensate data dependent nonlinear shifts in HAMR systems. Unlike conventional write precompensation methods for magnetic recording systems (where transition shifts are corrected by writing the transition slightly earlier or slightly later), this invention modulates the temperature transferred into the system by modulating the laser power. The method can be used alone to achieve the write precompensation functionality, or can be combined with the conventional methods in today's read channel chips.

In another aspect, this invention adjusts the transition locations by modulating the laser power (i.e., the temperature profile in the system), thus precompensating the NLTS effect of adjacent bits during the write process. Simulation results, obtained using two different HAMR signal modeling simulation environments (Thermal Williams-Comstock Model), and a micromagnetic model, show that the invention can compensate all the nonlinear shifts specified in current read channel chip architectures by just modulating the laser power within ±50° K temperature range.

In order to reduce possible unwanted effects created by temperature changes and/or to make the system more robust, the invention can use a small temperature range that can be implemented on read channel chips.

The laser power can be further modulated within the duration of bit length. This can shape the system response and make the system less sensitive to possible unwanted effects. For example, by modulating the laser power three times faster than the channel baud rate of the channel, the excessive ISI in the system can be reduced.

Other disturbances besides HMS could reduce the recording quality. Examples are media and head efficiencies, ambient temperature, component aging, etc. To compensate these disturbances, another embodiment of the invention compares the read signal with an optimum signal parameter. The method comprises: comparing a read signal with an optimum read signal parameter to produce a control signal, and modulating a source of electromagnetic radiation to heat a portion of a storage medium in response to the control signal. A look-up table can be used to alter the laser modulation. For example, the look-up table can map the control signal to a power of the source of electromagnetic radiation.

While the invention has been described in terms of several examples, it will be apparent to those skilled in the art that various changes can be made to the described examples without departing from the scope of the invention as set forth in the following claims.

What is claimed is:

1. A method of compensating a nonlinear transition shift in a heat assisted magnetic storage system, the method comprising:
    producing a control signal representative of nonlinear transition shift;
    modulating a source of electromagnetic radiation to heat a portion of the storage medium in response to the control signal; and
    applying a magnetic field to the storage medium to cause magnetic transitions in the storage medium, wherein transition locations in the storage medium are changed by changing a temperature profile in the storage medium.

2. The method of claim 1, wherein a look-up table is used to map nonlinear transition shift to a power of the source of electromagnetic radiation.

3. The method of claim 1, wherein a first look-up table is used to map a data pattern to a nonlinear transition shift, and a second look-up table is used to map the nonlinear transition shift to a power of the source of electromagnetic radiation.

4. The method of claim 1, wherein the source of electromagnetic radiation is controlled to vary a temperature in a storage medium over a range of ±50° K.

5. The method of claim 1, wherein the source of electromagnetic radiation is modulated within a bit duration length.

6. An apparatus comprising:
    a storage medium;
    a source of electromagnetic radiation for heating a portion of the storage medium;
    a recording head for applying a magnetic field to the storage medium to cause magnetic transitions in the storage medium, wherein transition locations in the storage medium are changed by changing a temperature profile in the storage medium; and
    a control circuit for producing a control signal representative of nonlinear transition shift and modulating the source of electromagnetic radiation in response to the control signal.

7. The apparatus of claim 6, wherein a look-up table is used to map nonlinear transition shift to a power of the source of electromagnetic radiation.

8. The apparatus of claim 6, wherein a first look-up table is used to map a data pattern to a nonlinear transition shift, and a second look-up table is used to map the nonlinear transition shift to a power of the source of electromagnetic radiation.

9. The apparatus of claim 6, wherein the source of electromagnetic radiation is controlled to vary a temperature in a storage medium over a range of ±50° K.

10. The apparatus of claim 6, wherein the source of electromagnetic radiation is modulated within a bit duration length.

* * * * *